United States Patent
DiSabatino

(10) Patent No.: US 10,281,026 B2
(45) Date of Patent: May 7, 2019

(54) LUBRICANT RETENTION SHIELD

(71) Applicant: Deere & Company, Moline, IL (US)

(72) Inventor: Benjamin DiSabatino, Brantford (CA)

(73) Assignee: DEERE & COMPANY, Moline, IL (US)

(*) Notice: Subject to any disclaimer, the term of this patent is extended or adjusted under 35 U.S.C. 154(b) by 278 days.

(21) Appl. No.: 15/337,800

(22) Filed: Oct. 28, 2016

(65) Prior Publication Data

US 2018/0119795 A1    May 3, 2018

(51) Int. Cl.
| | |
|---|---|
| *F16H 57/04* | (2010.01) |
| *F16H 1/06* | (2006.01) |
| *F16H 57/02* | (2012.01) |
| *F16H 57/12* | (2006.01) |

(52) U.S. Cl.
CPC .......... *F16H 57/0423* (2013.01); *F16H 1/06* (2013.01); *F16H 57/02* (2013.01); *F16H 57/0471* (2013.01); *F16H 57/0495* (2013.01); *F16H 57/12* (2013.01); *F16H 2057/02082* (2013.01)

(58) Field of Classification Search
CPC .................................................. F16H 57/0423
USPC ........................................................... 74/467
See application file for complete search history.

(56) References Cited

U.S. PATENT DOCUMENTS

| | | | | |
|---|---|---|---|---|
| 3,369,672 A * | 2/1968 | Lorence | ................ | B62D 55/062 188/83 |
| 3,811,577 A * | 5/1974 | Yancey | ................ | B62D 55/062 212/247 |
| 3,851,731 A * | 12/1974 | Jorgensen | ............ | B62D 55/062 184/6.2 |
| 3,854,553 A * | 12/1974 | Miller | ..................... | E02F 9/121 184/6.12 |
| 3,861,243 A * | 1/1975 | Fleischer | ................ | B66C 23/84 212/247 |
| 5,045,034 A | 9/1991 | Almeda, Jr. | | |
| 5,957,000 A * | 9/1999 | Pecorari | .................. | F16C 33/78 74/425 |
| 6,035,736 A | 3/2000 | Gyllner et al. | | |
| 9,196,777 B2 * | 11/2015 | Lucas Morata | ........... | F16H 1/16 |
| 9,279,477 B2 * | 3/2016 | Hein | ....................... | F16H 55/12 |
| 2003/0066370 A1 * | 4/2003 | Russ | ....................... | B66C 23/84 74/414 |

OTHER PUBLICATIONS

John Deere, Wrist, 753J and 759J, FR21B Disc Saw Felling Head (Worldwide Edition), Parts Catalog, Catalog No. 10111, Grid 0, Section 44, p. 17.

* cited by examiner

*Primary Examiner* — Jake Cook

(57) ABSTRACT

A wrist for a work vehicle includes a frame configured to be attached to the work vehicle, a ring pivotally connected to the frame and including a ring gear and a pilot axially protruding a length beyond the ring gear in a direction away from the frame, a shield cavity with an annular shape which surrounds the pilot and is bounded at least in part by the pilot and the ring gear and with a thickness of the length, a motor including a housing fixedly connected to the frame and an output shaft engaged with the ring gear, a lubricant cavity with boundaries defined at least in part by the frame, the ring, and a lubricant shield. The lubricant shield is removeably secured to the frame with at least a portion of the lubricant shield within the shield cavity.

18 Claims, 3 Drawing Sheets

LUBRICANT RETENTION SHIELD

TECHNICAL FIELD

The present disclosure generally relates to a machine. An embodiment of the present disclosure relates to a lubricant retention shield for a wrist for a work vehicle.

BACKGROUND

Work vehicles may utilize work tools which are designed to rotate relative to the work vehicle. These works vehicles may allow for such rotation by including a wrist, which allows for a pivotal connection between the work tool and the work vehicle. These wrists may utilize gears, bearings, and other meshed and sliding components to enable this pivotal connection. Lubricants may be employed on these components to reduce frictional forces and mitigate wear of the components. Seals, passages, and shields may be used to contain or control the flow of the lubricants.

SUMMARY

Various aspects of examples of the present disclosure are set out in the claims.

According to an aspect of the present disclosure, a wrist for a work vehicle may include a frame, a ring, a shield cavity, a motor, a lubricant cavity, and a lubricant shield. The frame may be configured to be attached to the work vehicle. The ring may include a ring gear and a pilot and be pivotally connected to the frame. The pilot may axially protrude a length beyond the ring gear in a direction away from the frame. The shield cavity may have an annular shape and surround the pilot, and be bounded at least in part by the pilot and the ring gear and have a thickness of the length. The motor may include a housing and an output shaft, with the housing fixedly connected to the frame and the output shaft engaged with the ring gear. The lubricant cavity may have boundaries defined at least in part by the frame, the ring, and a lubricant shield. The lubricant shield may be removeably secured to the frame with at least a portion of the lubricant shield within the shield cavity.

According to another aspect of the present disclosure, the lubricant shield, when secured to the frame, may adjoin the pilot so as to allow the lubricant cavity to confine a lubricant.

According to another aspect of the present disclosure, the lubricant shield may include an axial wearing face facing and radially overlapping the ring gear and a radial wearing face facing and axially overlapping the pilot.

According to another aspect of the present disclosure, the lubricant shield may include a sacrificial region with at least a portion of the radial wearing face included in the sacrificial region. The sacrificial region may be configured to wear away to conform to the portion of the pilot facing the radial wearing face.

According to another aspect of the present disclosure, the sacrificial region may be composed of a material with a hardness less than a surface hardness of the pilot.

According to another aspect of the present disclosure, the sacrificial region may be formed of a non-metallic material.

According to another aspect of the present disclosure, the output shaft may be engaged with the ring gear via a pinion and the sacrificial region may be formed of a material such that a particle of the lubricant shield caught between a mesh of the ring gear and the pinion will not damage either the ring gear or the pinion.

According to another aspect of the present disclosure, the lubricant shield may be formed of a material with a durometer less than Shore D 80.

According to another aspect of the present disclosure, the lubricant shield may include a core layer and a surface layer. The surface layer may cover the majority of a surface of the lubricant shield facing the ring gear and a majority of a surface of the lubricant shield facing the pilot. The core layer may be formed of a metallic material and the surface layer may be formed of a non-metallic material.

According to another aspect of the present disclosure, the lubricant shield may cooperate with the ring to form a passage open on a first side to the lubricant cavity, the passage may extend a first distance in a radial direction relative to the ring between the pilot and the lubricant cavity, and the passage may extend a second distance in an axial direction relative to the ring between the lubricant shield and the ring.

According to another aspect of the present disclosure, the first distance may be at least twice the second distance.

According to another aspect of the present disclosure, the first distance may be at least four times the second distance.

According to another aspect of the present disclosure, the passage may be a first passage, and the lubricant shield may cooperate with the pilot of the ring to form a second passage. The first passage may be open on a second side to the second passage and the second passage may also be open to atmosphere.

According to another aspect of the present disclosure, the second passage may extend a third distance in the radial direction between the lubricant shield and the pilot and extend a fourth distance in the axial direction between the first passage and atmosphere.

According to another aspect of the present disclosure, the fourth distance may be at least four times the third distance.

According to another aspect of the present disclosure, the lubricant shield may be formed of a material with a hardness less than a surface hardness of the ring gear.

According to another aspect of the present disclosure, the lubricant shield may be formed of a non-metallic material.

According to another aspect of the present disclosure, the second distance is less than 10 millimeters.

According to another aspect of the present disclosure, the third distance is less than 2 millimeters.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
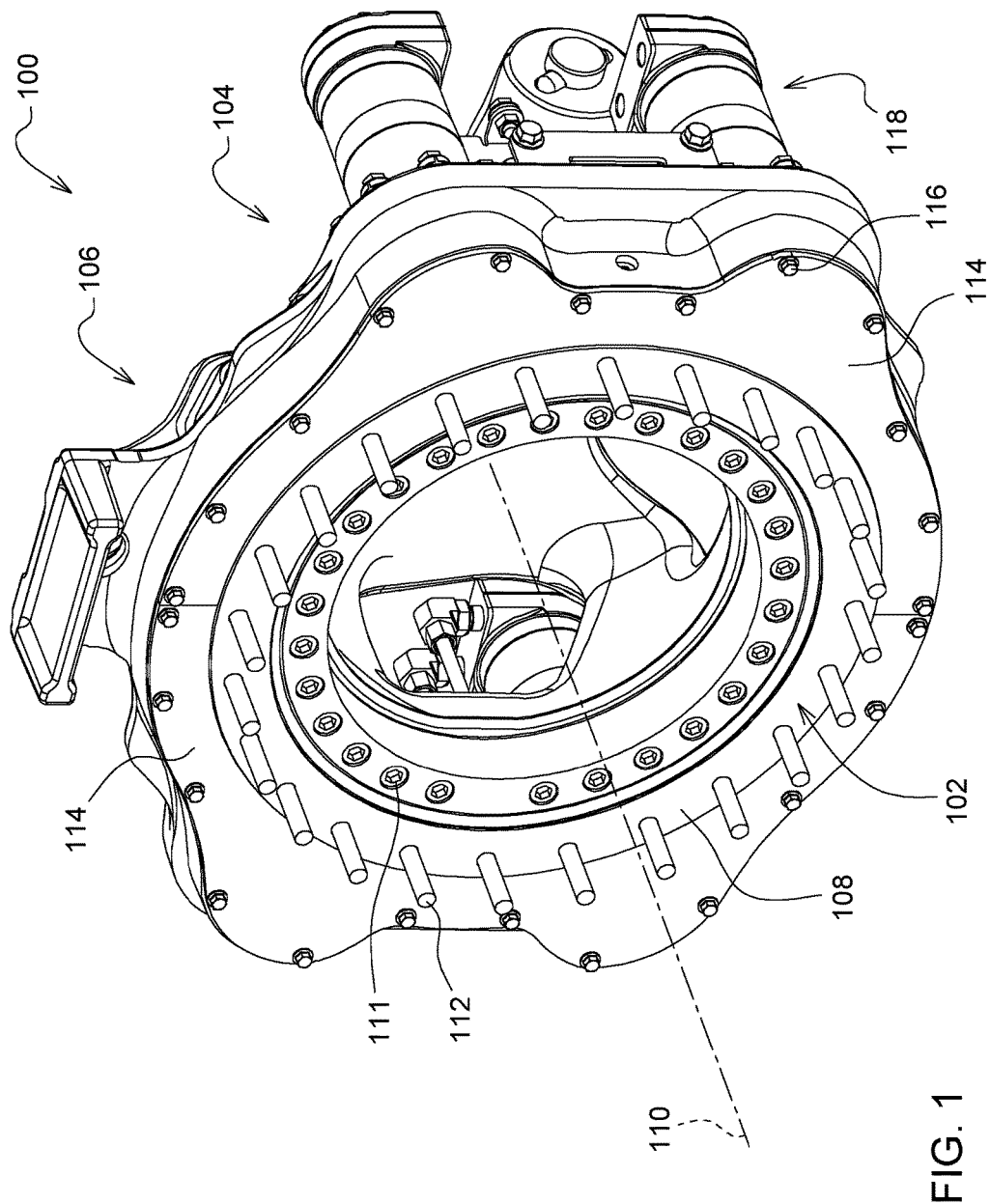
FIG. 1 is a perspective view of a wrist for a work vehicle.
Figure 2:
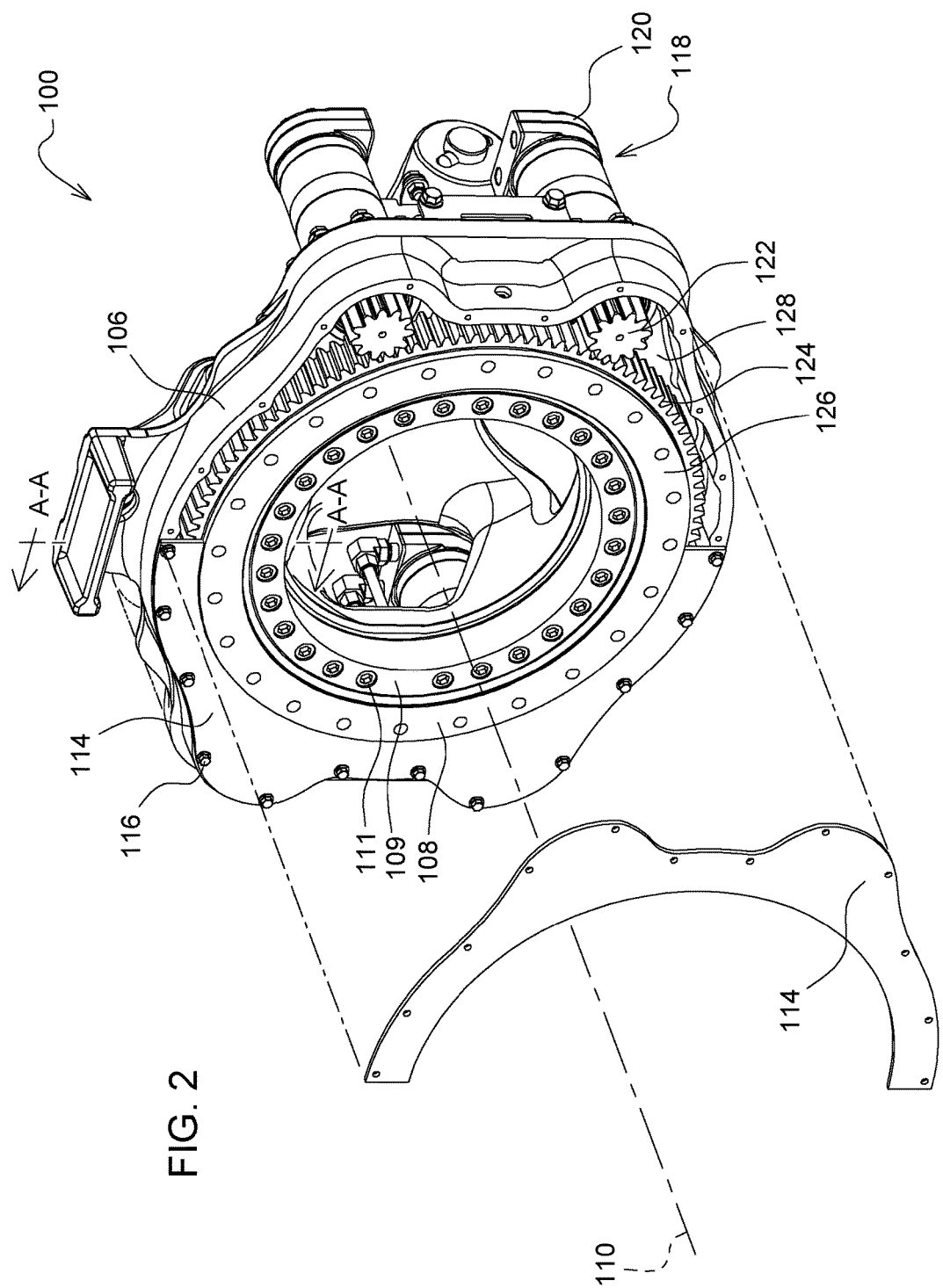
FIG. 2 is a perspective view of the wrist with a half of a lubricant shield disassembled from the wrist.
Figure 3:
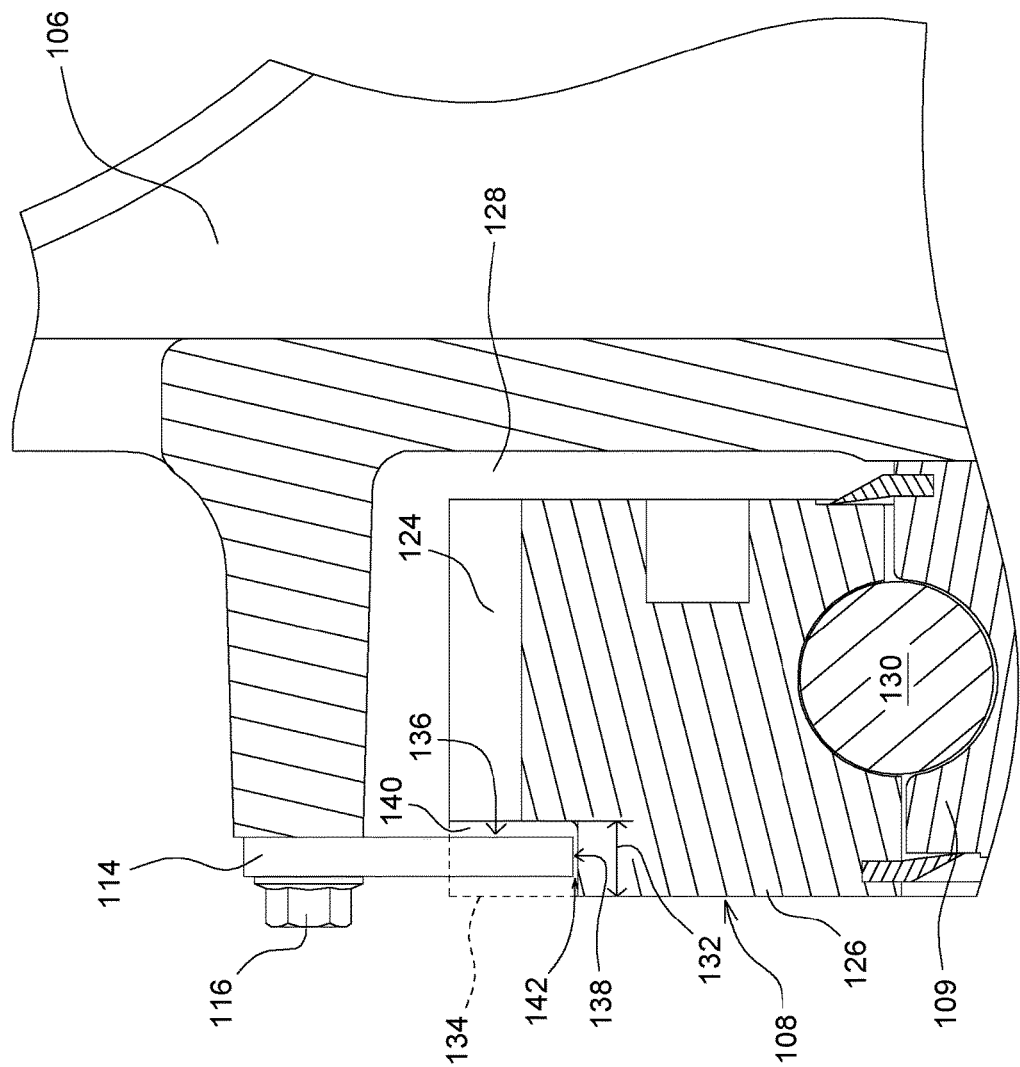
FIG. 3 is a section view of the wrist, taken along section A-A of FIG. 2.

At least one example embodiment of the subject matter of this disclosure is understood by referring to FIGS. 1 through 3 of the drawings.

FIG. 1 illustrates a wrist 100 which may be attached to a work vehicle. The wrist 100 may be used to connect a work tool to a work vehicle such that the work tool may be pivoted relative to the work vehicle. As one example, the wrist 100 may connect a disc saw felling head tool on a tool side 102 of the wrist 100 to a linkage of a feller buncher work vehicle on the vehicle side 104 of the wrist 100, enabling the disc saw felling head to rotate relative to the linkage. In alternate embodiments, the vehicle could be a construction, forestry, mining or other work vehicle, and the work tool could be any number of works tools such as felling heads, processing heads, grapples, hammers, or other work tools.

The wrist 100 comprises a frame 106 which provides structure and support for the wrist 100. The frame 106 is configured to be attached to the work vehicle, for example through a tiltable connection in which the frame 106 is joined to a linkage of the work vehicle by pins which enable the work vehicle to tilt the wrist 100 relative to the linkage. The linkage may also be actuated to position the wrist 100 relative to the work vehicle, such as by raising or lowering it. As an alternate, the frame 106 may be configured for a fixed connection to the work vehicle, such as a connection with a series of fasteners such as bolts. The frame 106 may be constructed from one or multiple components, different materials, and manufactured by a number of different methods, but as one example, it may comprise a cast part formed from iron or steel.

The wrist 100 also comprises a ring 108. The ring 108 is pivotally connected to the frame 106 so as to allow relative rotation between the two components about an axis 110, enabling a work tool connected on the tool side 102 of the wrist 100 to rotate relative to the frame 106 and the vehicle side 104 of the wrist 100. The ring 108 cooperates with an inner race 109 such that ring 108 and inner race 109 may be referred to collectively as a slew bearing or swing bearing. The inner race 109 is fixedly connected to the frame 106, such as by a series of fasteners 111, while the ring 108 may rotate relative to the inner race 109 and therefore rotate relative to the frame 106.

A work tool may be joined to the ring 108 by a series of fasteners 112 or by any of a number of different techniques known in the art. In this embodiment, the frame 106 and ring 108 each have a cavity surrounding the axis 110, enabling components such as hydraulic, electrical, pneumatic, lubrication, or dye lines to be routed through the frame 106 and the ring 108 to connect to a work tool. Routing such lines through the wrist 100 near the axis 110 may reduce the variations in line length and position resulting from rotation of the ring 108 relative to the frame 106, which in turn may reduce the amount of slack necessary in the lines or increase the life of the lines through a reduction in movement and chafing. While the wrist 100 illustrated in FIGS. 1-3 is designed to allow limited rotation of the ring 108 to the frame 106, and thus allow a work tool only a limited range of clockwise or counterclockwise rotation about the axis 110, some alternate embodiments are designed to permit unlimited rotation in either direction.

The wrist 100 also comprises a lubricant shield 114 which is removably secured to the frame 106 with a series of fasteners 116. The lubricant shield 114 covers and closes off some of the cavities between the frame 106 and the ring 108. By covering and closing off these cavities, the amount of debris (e.g., dust, dirt, rock, and wood chips) which enters the cavities may be reduced. Such debris can damage certain components of the wrist 100, degrade its performance, or necessitate increased maintenance. Additionally, the lubricant shield 114 covering and closing off the cavities enables a lubricant to be confined within the cavities. Fresh lubricant may be injected into the cavities to lubricate components within the cavities and to flush old lubricant and debris trapped therein out of gaps or reliefs between the lubricant shield 114, ring 108, and frame 106.

The rotation of the ring 108 relative to the frame 106 may be controlled by one or more hydraulic motors 118, which in turn are controlled by pressurized hydraulic fluid supplied by pumps and valves on the work vehicle. In FIG. 2, one half of the lubricant shield 114, fasteners 112, and some of fasteners 116 have been removed to better show certain of the components of the wrist 100 and how the hydraulic motors 118 rotate the ring 108 relative to the frame 106. As shown in FIG. 2, the lubricant shield 114 may be comprised of two separate halves which are each fastened to the frame 106. In alternate embodiments, the lubricant shield 114 may be integrally formed as one piece, or may be formed from more than two pieces.

Each of the hydraulic motors 118 has a housing 120 which is fixedly connected to the frame 106, such as by a pattern of bolts, at a distance from the axis 110. Each of the hydraulic motors 118 also has an output shaft (not shown), which rotates relative to the housing 120, with a pinion 122 mounted on the end.

The ring 108 comprises a circular ring gear 124 and a pilot 126. The ring gear 124 is engaged with (meshes with) each pinion 122, and is therefore engaged with the output shaft of each of the hydraulic motors 118. Thus, the hydraulic motors 118 drive the rotation of the ring 108 relative to the frame 106 via the output shaft, pinion 122, and ring gear 124, and control of the hydraulic motors 118 results in control of the orientation of a work tool attached to the wrist 100 about the axis 110, and rotation of a work tool relative to the work vehicle.

Lubrication of the ring gear 124 and the pinion 122 of each of the hydraulic motors 118 may improve the operation or life of the wrist 100, or reduce the need for maintenance. To provide this lubrication, a lubricant may be added to a lubricant cavity 128 which is bounded by the frame 106, ring 108, and lubricant shield 114. As shown in FIGS. 1-3 and described herein, the lubricant shield 114 may close off the lubricant cavity 128 and thereby contain lubricant within the cavity. As the term "contain" is used herein, the lubricant shield 114 need not form a fluid-tight seal of the lubricant cavity 128 in order to contain the lubricant, but must enclose the lubricant cavity 128 to a degree that lubricant may be retained in the lubricant cavity 128 for the hours, days, or weeks between lubrication intervals for the wrist 100. In certain embodiments such as the one illustrated in FIG. 1-3, the lubricant shield 114 may be formed so as to encourage the formation of limited gaps between the lubricant shield 114 and the ring 108 through which used lubricant may escape as new lubricant is forced into the lubricant cavity 128. In such embodiments, the addition of new lubricant into the lubricant cavity 128 may force the old lubricant and any debris embedded therein out of the lubricant cavity 128 where it may be wiped off the wrist 100, leaving the lubricant cavity 128 with fresh lubricant and less debris.

This arrangement will be described in more detail with reference to FIG. 3, which is a sectional view of a portion of the wrist 100, taken along the plane A-A shown in FIG. 2. The ring 108, the inner race 109, and a plurality of ball bearings 130 cooperate to form a slew bearing which allows the ring 108 to rotate relative to the frame 106. The frame 106, ring 108, and lubricant shield 114 bound the lubricant cavity 128, with the lubricant shield 114 enclosing the lubricant cavity 128 sufficiently to confine lubricant and allow it to continue lubricating the ring gear 124 and the pinion 122 of each of the hydraulic motors 118 rather than flowing out of the lubricant cavity 128 too rapidly before the next maintenance interval. To do so, the lubricant shield 114 adjoins, or comes close to contact (i.e., 4 millimeters of clearance or less, such as 2 millimeters or 1 millimeter) or in intermittent contact with, the pilot 126 so as to restrict the flow of lubricant out of the lubricant cavity 128.

The pilot 126 is a cylindrically shaped portion of the ring 108 which protrudes a length 132 beyond the ring gear 124 in a direction away from the frame 106. The pilot 126 and the ring gear 124 cooperate to form a shield cavity 134 with an annular shape and a thickness of the length 132. The shield cavity 134 can be approximated by the rotation of a rectangle about the axis 110, where the rectangle is bounded by the pilot 126 on one side and bounded by the ring gear 124 on the other side. The lubricant shield 114 extends inward from the frame 106 toward the pilot 126 such that a portion of the lubricant shield 114 is within the shield cavity 134. The lubricant shield 114 is formed from ultra-high molecular-weight polyethylene (which may be referred to as UHMW or UHMWPE), which may have a durometer of 68 Shore D.

In alternate embodiments, the lubricant shield 114 may be formed from a number of other materials, such as non-metallic materials, polymers (e.g., polyethylenes, polypropylenes), materials with a hardness less than the surface hardness of the pilot 126 or ring gear 124 or the pinion 122, or other materials with a durometer below Shore D 80. Forming the lubricant shield 114 from such materials may allow it to wear away from interferences with the pilot 126 or ring gear 124, and may reduce the damage done if a piece of the lubricant shield 114 becomes dislodged and caught between the ring gear 124 and pinion 122, as such materials may yield and deform instead of causing significant damage or wear to the ring gear 124 or pinion 122. The reduction of risk of contamination and damage from pieces of the lubricant shield 114 may allow the wrist 100 to be designed with tighter clearances between the lubricant shield 114 and the ring 108 or wider tolerances on portions of those components than a similar design utilizing a metallic lubricant shield (e.g. steel). Wider tolerances may allow for reduced manufacturing costs of the components, for example by allowing the lubricant shield 114 to wear-in if assembly results in any interferences between the lubricant shield 114 and the ring 108. Tighter clearances may also allow the lubricant shield 114 to more tightly enclose the lubricant cavity 128, reducing the ingestion of debris into the lubricant cavity 128 and the unintended flow of lubricant out of the lubricant cavity 128.

The lubricant shield 114 may be configured to wear to conform to the wrist 100. The lubricant shield 114 comprises an axial wearing face 136 which faces and radially overlaps the ring gear 124 and a radial wearing face 138 which faces and axially overlaps with the pilot 126. If the wrist 100 is designed with tight tolerances or interference fits between the lubricant shield 114 and the ring 108, the rotation of the ring relative to the frame 106 will cause the lubricant shield 114 to wear where it contacts the harder ring gear 124 and pilot 126. As the wrist 100 is operated and the ring 108 rotated repeatedly, the lubricant shield 114 may gradually conform to the shape of the ring 108. The regions where the lubricant shield 114 is configured to allow such wear, such as axial wearing face 136 and radial wearing face 138, may be referred to as sacrificial regions. While these regions may be configured such that wear is acceptable or even desirable to provide the right fit, the regions may cease to wear away after a short period of operation as the regions wear in to match their mating surfaces. In this way, they may be referred to as sacrificial regions, but the material may be sacrificed for only a short period of time in operation. In the wrist 100 illustrated in FIGS. 1-3, the entirety of the lubricant shield 114 is formed from UHMW and thus wears to conform to the ring 108, but in alternate embodiments, the lubricant shield 114 may be composed of multiple materials, such as a steel core layer surrounded by a UHMW (or another of the materials described above) surface layer which can wear without creating particles that will damage the ring gear 124 or the pinion 122.

The configuration and positioning of the lubricant shield 114 may also aid in restricting the flow of lubricant out of the lubricant cavity 128. The placement of a portion of the lubricant shield 114 in the shield cavity 134 allows the lubricant shield 114 to cooperate with the ring 108 to form a first passage 140 radially extending a first distance from the tip of the teeth of the ring gear 124 to the pilot 126 and axially extending a second distance from the lubricant shield 114 to the ring gear 124. This first passage is narrowly shaped, such that in the embodiment shown in FIGS. 1-3 the first distance is 30 millimeters and the second distance is 5 millimeters, so the first distance is more than five times the second distance. In other embodiments, the ratio of the first distance to the second distance could be less, such as only twice or four times.

The placement of the lubricant shield 114 creates a second passage 142 between the lubricant shield 114 and the pilot 126, extending radially a third distance between the pilot 126 and the lubricant shield 114 and axially a fourth distance between the first passage and the outside of the wrist 100, or atmosphere. This second passage is also narrowly shaped, for example with a third distance of 1 millimeters and a fourth distance of 8 millimeters. In alternate embodiments, the lubricant shield 114 may have almost no clearance with the pilot 126, such that the second passage does not exist or exists only intermittently during operation of the wrist 100.

The first passage and the second passage cooperate to form a labyrinth which aids in containing lubricant by providing only a highly restrictive path for flow out of the lubrication cavity 128. Forming the lubricant shield 114 from a UHMW or another of the types of materials listed above may provide for a more flexible labyrinth than if the lubricant shield 114 was formed from a metal (e.g., steel). As lubricant is added to the lubricant cavity 128, lubricant may be forced along the labyrinth of the first passage 140 and the second passage 142, but if lubricant is added faster than it may leak out through the labyrinth, pressure may build against the lubricant shield 114. The lubricant shield 114 may deflect and allow a greater flow of lubricant out of the lubricant cavity 128 at lower pressures than an equivalent shield made from steel, thereby allowing a lubricant purge to happen at lower pressures in the lubricant cavity 128.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A wrist for a work vehicle, the wrist comprising:
    a frame configured to be attached to the work vehicle;

a ring comprising a ring gear and a pilot, the ring pivotally connected to the frame, the pilot axially protruding a length beyond the ring gear in a direction away from the frame;

a shield cavity with an annular shape, the shield cavity surrounding the pilot, bounded at least in part by the pilot and the ring gear, and with a thickness of the length;

a motor comprising a housing and an output shaft, the housing fixedly connected to the frame, the output shaft engaged with the ring gear;

a lubricant cavity with boundaries defined at least in part by the frame, the ring, and a lubricant shield; and the lubricant shield removeably secured to the frame with at least a portion of the lubricant shield within the shield cavity;

wherein the lubricant shield comprises an axial wearing face facing and radially overlapping the ring gear, a radial wearing face facing and axially overlapping the pilot, and a sacrificial region, and at least a portion of the radial wearing face is included in the sacrificial region and the sacrificial region is configured to wear away to conform to the portion of the pilot facing the radial wearing face.

2. The wrist of claim 1, wherein the lubricant shield, when secured to the frame, adjoins the pilot so as to allow the lubricant cavity to confine a lubricant.

3. The wrist of claim 1, wherein the sacrificial region is composed of a material with a hardness less than a surface hardness of the pilot.

4. The wrist of claim 1, wherein the sacrificial region is formed of a non-metallic material.

5. The wrist of claim 1, wherein the output shaft is engaged with the ring gear via a pinion and the sacrificial region is formed of a material such that a particle of the lubricant shield caught between a mesh of the ring gear and the pinion will not damage either the ring gear or the pinion.

6. The wrist of claim 1, wherein the lubricant shield is formed of a material with a durometer less than Shore D 80.

7. The wrist of claim 1, wherein the lubricant shield includes a core layer and a surface layer, the surface layer covers the majority of a surface of the lubricant shield facing the ring gear and a majority of a surface of the lubricant shield facing the pilot, the core layer is formed of a metallic material, and the surface layer is formed of a non-metallic material.

8. The wrist of claim 1, wherein the lubricant shield cooperates with the ring to form a passage, the passage is open on a first side to the lubricant cavity, the passage extends a first distance in a radial direction relative to the ring between the pilot and the lubricant cavity, and the passage extends a second distance in an axial direction relative to the ring between the lubricant shield and the ring.

9. The wrist of claim 8, wherein the first distance is at least twice the second distance.

10. The wrist of claim 9, wherein the first distance is at least four times the second distance.

11. The wrist of claim 8, wherein the passage is a first passage, the lubricant shield cooperates with the pilot of the ring to form a second passage, the first passage is open on a second side to the second passage, and the second passage is also open to atmosphere.

12. The wrist of claim 11, wherein the second passage extends a third distance in the radial direction between the lubricant shield and the pilot and extends a fourth distance in the axial direction between the first passage and atmosphere.

13. The wrist of claim 12, wherein the fourth distance is at least four times the third distance.

14. The wrist of claim 13, wherein the lubricant shield is formed of a material with a hardness less than a surface hardness of the ring gear.

15. The wrist of claim 13, wherein the lubricant shield is formed of a non-metallic material.

16. The wrist of claim 13, wherein the lubricant shield is formed of a material with a durometer less than Shore D 80.

17. The wrist of claim 8, wherein the second distance is less than 10 millimeters.

18. The wrist of claim 12, wherein the third distance is less than 2 millimeters.

* * * * *